United States Patent [19]

Stephenson

[11] Patent Number: 5,768,638
[45] Date of Patent: Jun. 16, 1998

[54] SINGLE-USE CAMERA WITH CHEMICAL FLASH ARRAY

[75] Inventor: Stanley W. Stephenson, Spencerport, N.Y.

[73] Assignee: Eastman Kodak Company, Rochester, N.Y.

[21] Appl. No.: 956,927

[22] Filed: Oct. 23, 1997

Related U.S. Application Data

[63] Continuation of Ser. No. 748,674, Nov. 13, 1996, abandoned.

[51] Int. Cl.$^6$ ............................................. G03B 15/03
[52] U.S. Cl. .......................... 396/178; 396/180; 396/192; 396/205; 396/6
[58] Field of Search ............................ 396/155, 176, 396/178, 180, 182, 192, 205, 6; 362/11, 15; 431/357, 358, 359, 362, 365

[56] References Cited

U.S. PATENT DOCUMENTS

| | | | |
|---|---|---|---|
| 3,598,985 | 8/1971 | Harnden, Jr. | 362/11 |
| 3,608,451 | 9/1971 | Kelem | 354/143 |
| 3,995,290 | 11/1976 | Graham | 396/192 |
| 5,319,404 | 6/1994 | Swayze | 396/178 |
| 5,502,526 | 3/1996 | Katano | 354/228 |
| 5,559,571 | 9/1996 | Miyamoto et al. | 354/286 |

*Primary Examiner*—Howard B. Blankenship
*Attorney, Agent, or Firm*—Thomas H. Close

[57] ABSTRACT

A single-use camera including a camera body, a shutter driver, a battery, a film advance mechanism and a film frame counter connected to the film advance mechanism, includes a chemical flash arrangement having a compact photoflash lamp array. The photoflash lamp array employs a flexible circuit having a plurality of electrical conductors leading to an array of igniter links and defining the contacts of a commutator, and a common electrical connection to each igniter link. A combustible mass is deposited over each igniter link and a grid defining a corresponding array of combustion cavities is bonded to the substrate. A sheet of transparent material is bonded over the grid to contain the combustion products of the combustible mass. A commutator contact carried by the frame counter contact carries current from the battery and cooperates with the contacts on the flexible circuit to provide sequential electrical connection to successive igniter links. A switch is closed by the shutter driver to electrically connect the battery through the commutator to an igniter link.

19 Claims, 4 Drawing Sheets

SINGLE-USE CAMERA WITH CHEMICAL FLASH ARRAY

CROSS-REFERENCE TO RELATED APPLICATIONS

This is a continuation of application Ser. No. 08/748,674, filed 13 Nov., 1996, now abandoned.

FIELD OF THE INVENTION

The invention relates generally to the field of photography, and in particular to compact photoflash lamps containing combustible material and more particularly to a single-use camera that sequentially discharges such a photoflash lamp flash for each exposure.

BACKGROUND OF THE INVENTION

Single-use cameras having electronic flash are currently available in the market. One drawback of the electronic flash is the cost, about $3.00 U. S. for each flash unit. These flash units must be recovered from the single-use cameras and recycled several times to recover the investment. If the flash units are destroyed or otherwise diverted, the manufacturer is unable to recover the investment and loses money on the sale of the single-use camera. An alternative would be to provide a chemical flash for the single-use camera. However, the costs of conventional chemical flash units having multiple flash bulbs are not presently low enough to be competitive with the electronic flash units. Such multiple flash units require a plurality of bulbs, a support circuit board, electrical interconnections and a separate sequencing arrangement in the camera. For example, see U.S. Pat. No. 3,608,451, issued Sep. 28, 1971 to Kelem.

There is a need therefore for an improved chemical flash unit for use in a single-use camera.

SUMMARY OF THE INVENTION

The present invention is directed to overcoming one or more of the problems set forth above. Briefly summarized, according to one aspect of the present invention, a single-use camera including a camera body, a shutter driver, a battery, a film advance mechanism and a film frame counter connected to the film advance mechanism, includes a chemical flash arrangement having a compact photoflash lamp array. The photoflash lamp array employs a flexible circuit having a plurality of electrical conductors leading to an array of igniter links and defining the contacts of a commutator, and a common electrical connection to each igniter link. A combustible mass is deposited over each igniter link and a grid defining a corresponding array of combustion cavities is bonded to the substrate. A sheet of transparent material is bonded over the grid to contain the combustion products of the combustible mass. A commentator contact carried by the frame counter contact carries current from the battery and cooperates with the contacts on the flexible circuit to provide sequential electrical connection to successive igniter links. A switch is closed by the shutter driver to electrically connect the battery through the commutator to an igniter link.

According to another aspect of the present invention, a compact photoflash lamp array includes a flexible circuit having a plurality of electrical conductors leading to an array of igniter links, and a common electrical connection to each igniter link. A combustible mass is deposited over each igniter link, and a structure for containing each combustible mass and allowing light to escape therefrom is bonded onto the flexible circuit.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages. The chemical flash unit is less expensive than glass bulb flash units, and provides a more compact storage for a flash unit associated with the camera. The flex circuit provides all of the electrical connections for the flash unit, thereby keeping parts count to a minimum. It provides a simple low cost chemical flash for a single-use camera. Additionally, the flash array of the present invention uses very little battery power, and therefor can employ a very inexpensive battery, and there is no time lag between exposures associated with recharging a flash capacitor.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The invention is disclosed as being embodied preferably in a single-use camera. Because the features of a single-use camera are generally known, the description which follows is directed in particular to those elements forming part of or cooperating directly with the disclosed embodiment. It is to be understood, however, that other elements may take various forms known to a person of ordinary skill in the art.

Figure 1:
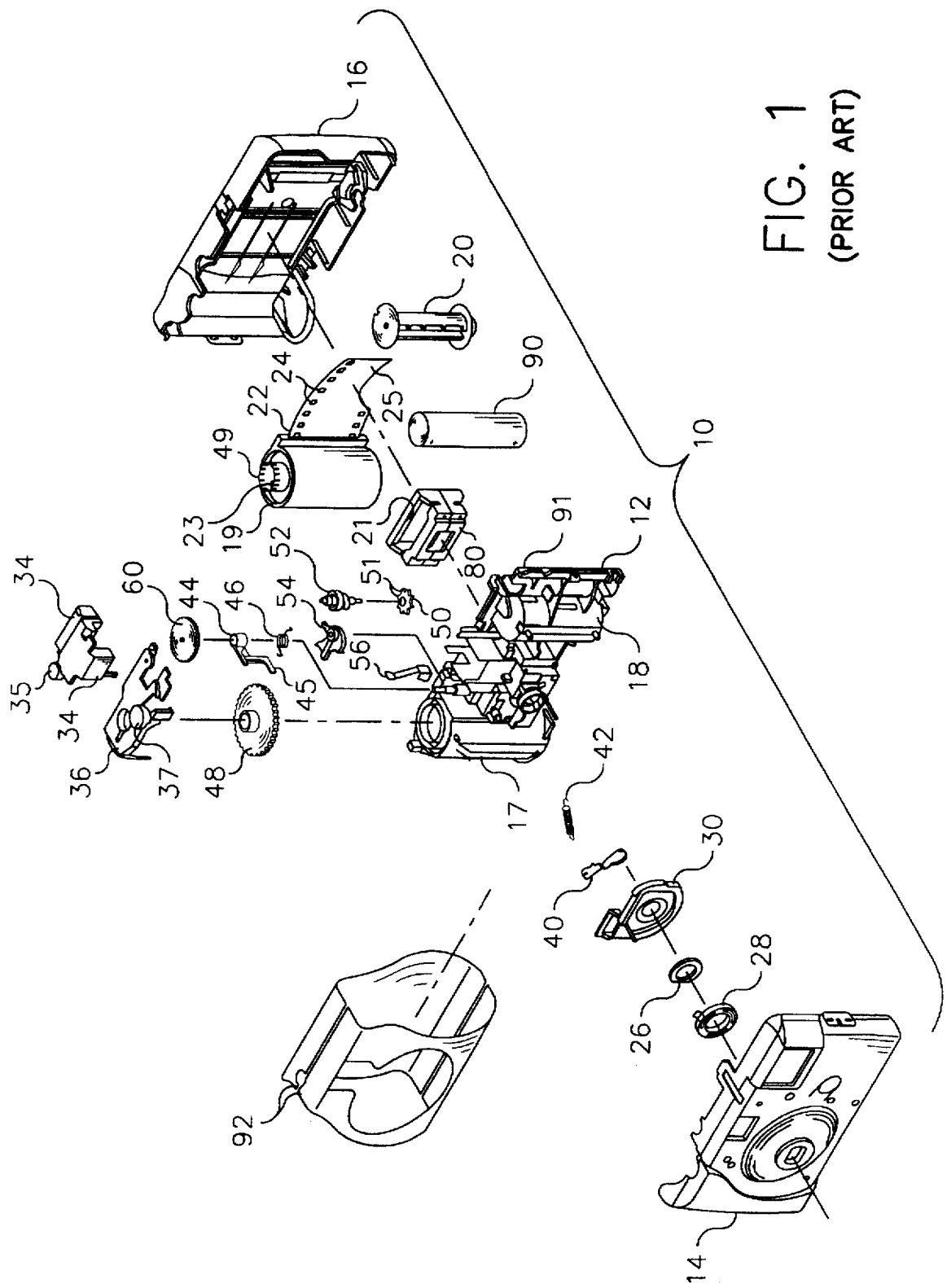
FIG. 1 is an exploded perspective view of a prior art single-use camera useful with the present invention.

Referring now to FIG. 1, a prior art single-use camera 10 useful for practicing the present invention will first be described. The camera 10 includes a plastic main body part 12, and a pair of plastic front and rear cover parts 14 and 16 which connect to one another to house the main body part between them in order to complete the camera assembly. The main body part 12 has integral cartridge-receiving and film roll chambers 17 and 18 for a light-tight film cartridge 19 and a film take-up spool 20. The chambers 17 and 18 are located at opposite sides of a backframe or film exposure opening 21, at which successive frames of a filmstrip 22 are exposed during picture-taking. The filmstrip 22 is normally stored in a roll form on a cartridge spool 23 rotatably supported inside the film cartridge 19, and has a longitudinal series of edge perforations 24 included along a film leader 25 which protrudes from the film cartridge.

The main body part 12 supports various camera elements which are attached to the main body part before it is nested in the front cover part 14. The front and rear cover parts 14 and 16 are connected to one another to house the main body part between them. The camera elements include a fixed-focus taking lens 26 which is sandwiched between a snap-on lens retainer 28 and a lens support plate 30, connected to the main body part at its front. A pair of front and rear viewfinder lenses 34 (only the front viewfinder lens is shown in FIG. 1) and an integral frame magnifier 35 are connected to the main body part at its top.

A shutter mechanism includes a keeper plate 36 having an integral manually depressed shutter release button 37 for releasing a pivotally mounted shutter blade 40. A shutter return spring 42 returns the shutter to a closed position after actuation. A high energy lever 44 powered by a lever actuating spring 46 is adapted to strike the shutter blade to pivot the blade open in order to uncover the taking lens to make a film exposure.

A film advancing and metering mechanism includes a manually rotatable thumbwheel 48 for engaging an exposed end 49 of the cartridge spool 23 to rotate the spool in order to wind an exposed frame of the filmstrip 22 into the film cartridge 19 after each film exposure. A film metering sprocket 50 has an annular array of peripheral teeth 51 for successively engaging the respective perforations 24 in the filmstrip. A metering cam 52 cooperates with the metering sprocket 50, a metering lever 54 and a metering spring 56 in a known manner with a rotatable frame counter 60 (made readable via the frame magnifier 35) to indicate the number of exposures remaining in the camera. The thumb wheel 48 and the metering sprocket 50 cooperate to decrement the frame counter to its next lower-numbered setting and to lock the winder wheel (until the shutter release button 37 is depressed) after the winder wheel is rotated to wind an exposed frame into the film cartridge 19.

A light baffle 80 defines a backframe opening 21. A flash battery 90 is held in a battery-receiving chamber 91 in the main body part 12. A pair of front and rear decorative labels 92 cover central portion of the front and rear cover parts 14 and 16 after the front and rear cover parts are connected to one another to house the main body part 12 between them.

The prior art single-use camera described above meters and exposes film with three rotating elements. The metering cam 52 rotates once to meter each frame of film 25. Metering cam 52 moves a high-energy lever 44 to a cocked position as each new frame is metered. Shutter release button 37 holds high energy lever 44 in the cocked position. The frame counter 60 is advanced slightly for each metered frame to indicate exposures remaining. The present invention employs the above described single-use camera mechanism to sequence and fire the chemical flash lamps in an array.

Figure 2:
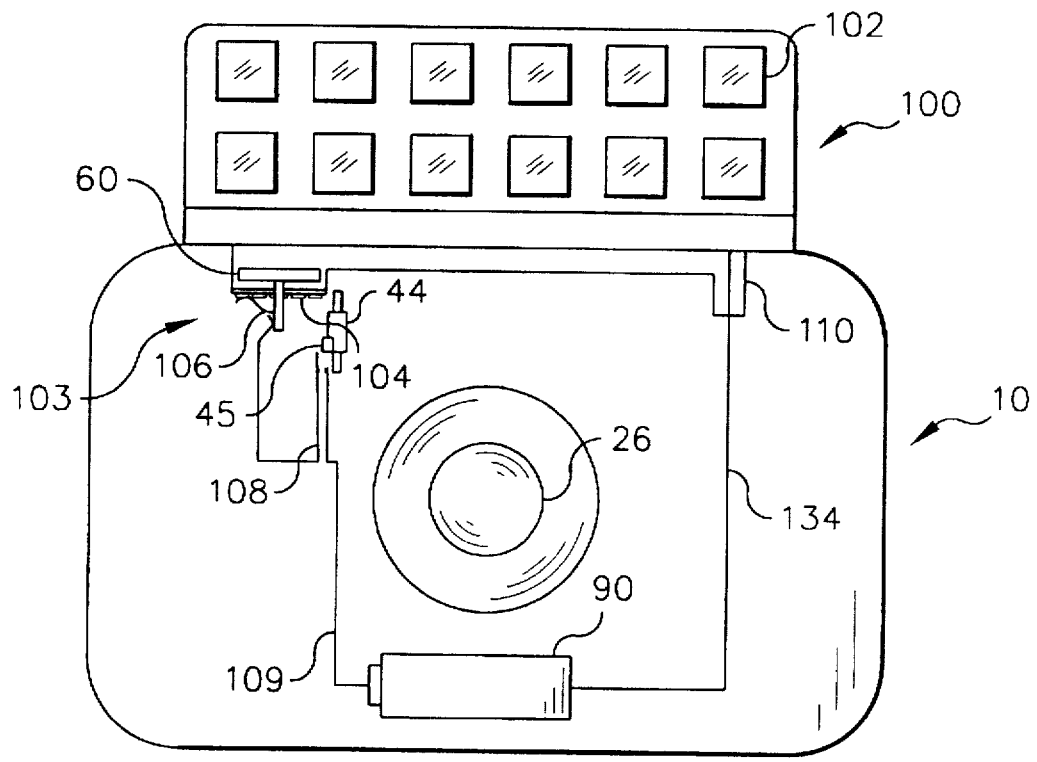
FIG. 2 is a schematic front view of a single-use camera according to the present invention.
Figure 3:
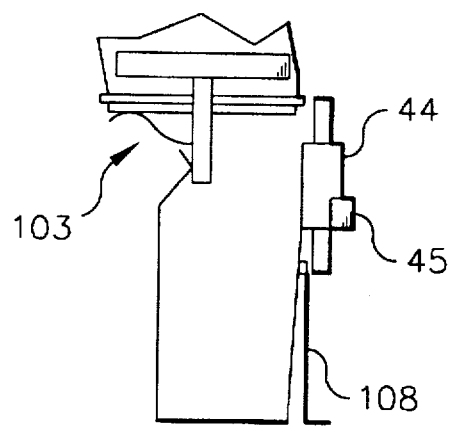
FIG. 3 is a partial schematic of the flash firing switch shown in FIG. 2.

Referring now to FIG. 2, apparatus using the single-use camera metering mechanism for firing a flash with each frame of film will be described. The single-use camera 10 includes a chemical flash array 100. In a preferred embodiment, the flash array 100 can be folded over the top of the camera for storage and can is erected for image capture. The power from battery 90 is sequentially applied to the flash units 102 in the flash array by a commutator 103 including a set of commutator contacts 104 and a commutator brush 106 carried by the frame counter 60. A flash firing switch 108 is normally held open by a lug 45 on high energy lever 44 when the high energy lever is in the cocked position. Power is provided to flash firing switch 108 through conductor 109 that is connected to one terminal of the battery 90. Electrical connections to the flash array 100 are provided by a flex circuit 110. As shown in FIG. 3, when the shutter of camera 10 is actuated, high energy lever 44 rotates to move lug 45 away from flash firing switch 108, thereby closing flash firing switch 108 to fire the flash element that is presently connected to battery 90 by commutator 103.

Figure 4:
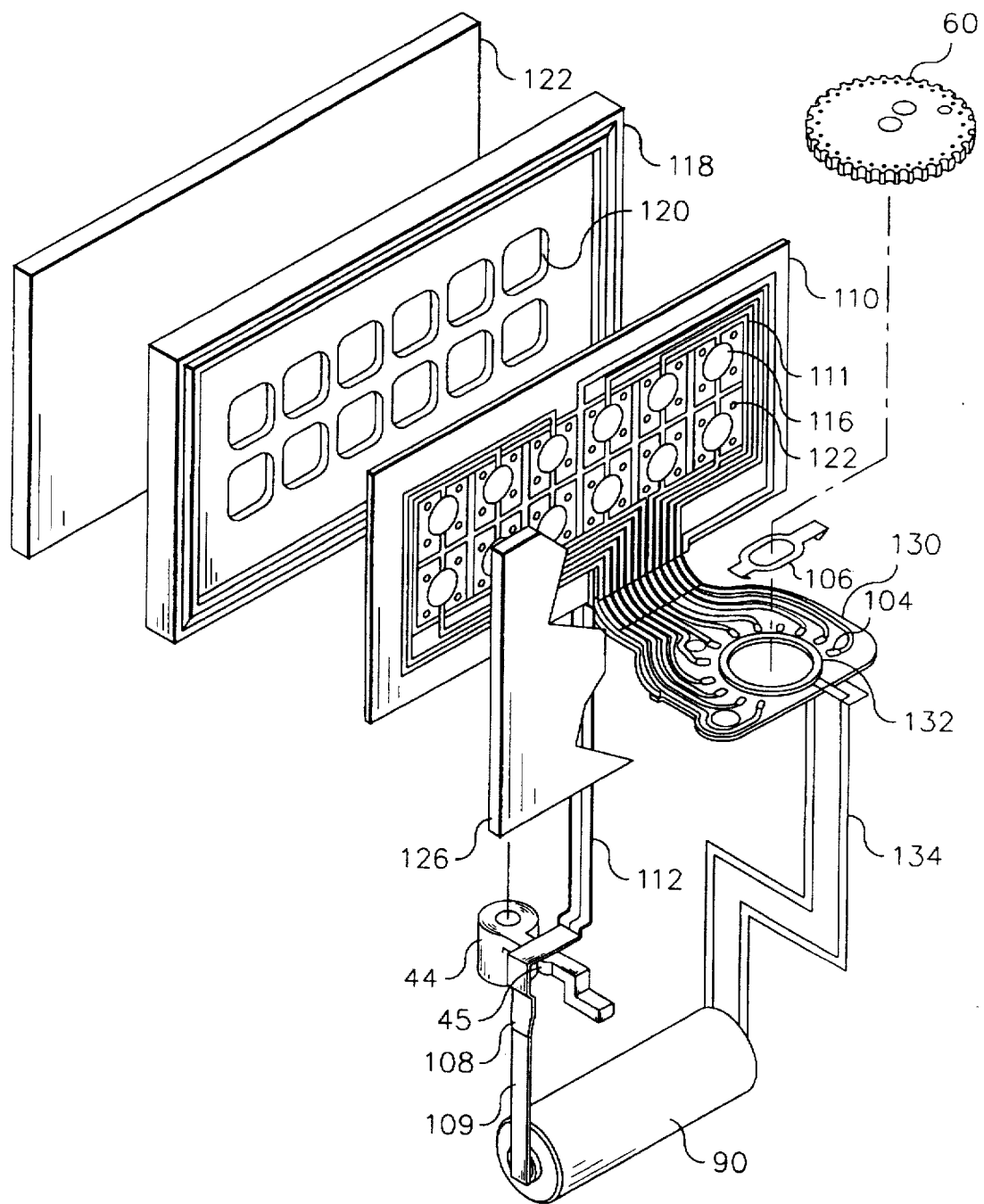
FIG. 4 is an exploded perspective view of the flash array and flash firing circuit of the camera shown in FIG. 2.

Referring to FIG. 4, the flash array 100 will be described in more detail. The flash elements 102 in flash array 100 are constructed on the flexible circuit 110. Flexible circuit 110 is preferably a Kapton™ polyimide. Alternatively, the flex circuit may be formed on a lower melt temperature polymer such as polyethylene or polycarbonate. It has been found that relatively thin flex circuit materials may be used in the flash array of the present invention (e.g. 3 mil Kapton™). This is true in spite of the highly intense heat generated by the flash, due to its relatively short duration. Conductors 111 on the flexible circuit connect the flash elements 102 in the flash array 100 to the battery 90 through commutator contacts 104. The flex circuit 100 also connects one side of each flash element to a ground trace 112. The ground trace 112 folds through a pivot into the camera body and connects to the battery 90 stored in the camera.

Figure 5:
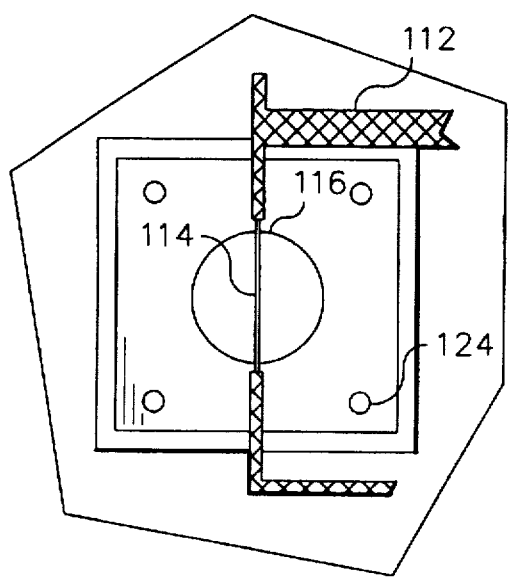
FIG. 5 is a partial schematic illustrating one of the flash units in the flash array.

Referring to FIG. 5, the ground trace 112 is connected to one side of the flash element and conductors 111 are connected to the other side. The conductors 111 and ground trace 112 are standard circuit board traces of copper approximately 1.25 mm wide. The flash unit 102 includes a fusible igniter link 114, preferably 25 μm diameter copper wire, soldered between conductor 111 and ground trace 112. A combustible mass 116 is deposited over each igniter link 114. It has been found to be important to completely cover the igniter link 114 with the combustible mass 116. Preferably, the combustible mass 116 is a mixture of coarsely powdered zirconium (−320 sieve), finely powdered zirconium (5 μm zirconium dust), an oxidizer such as a chlorate or perchlorate (preferably −200 and +400 sieve potassium perchlorate), and polymeric binder (preferably polyacrilamide) all dispersed in water. A mass of 22 to 40 mg (preferably 35 mg) of the resulting slurry are deposited onto the igniter link 114 and oven dried at 90° C. for 24 hours. The resulting combustible mass 116 is capable of ignition with a single alkaline AA battery to produce approximately 120 candela seconds of illumination.

Referring back to FIG. 4, a grid 118 defining a plurality of chambers 120 is bonded to the surface of the flex circuit 110. The chambers 120 are approximately 1 cc in volume. Preferably, grid 118 is an acrylic polymer loaded with a high concentration of titanium dioxide or other filler that has high reflectivity. Alternatively, the grid 118 is a plastic that is vacuum coated with reflective aluminum. In a further embodiment, the plastic grid is coated with a highly reflective electroless nickel coating. In a still further embodiment, the grid 118 is formed as an aluminum extrusion that is chemically polished. In a still further embodiment, the grid is chemically polished die cast aluminum. The grid 118 is bonded to the substrate by an adhesive such as an epoxy resin or a silicone rubber adhesive. A transparent sheet 122 is bonded to the top of the grid 118 to complete the enclosures for the photoflash lamps in the assembly. The transparent sheet 122 may be, for example, 1 mm thick glass, 0.5 mm thick glass coated plastic with the glass coating on the inside of the chamber, or 0.5 mm thick acrylic. The transparent sheet 122 is bonded to the grid 118 with an adhesive such as epoxy or silicone rubber.

In a preferred embodiment of the photoflash lamp array, the flex circuit 110 is perforated with vent holes 124 adjacent each combustible mass 116. In one arrangement four 1.25 mm diameter perforations are arranged symmetrically around each combustible mass 116. The vent holes 124 allow the combustion by-products to escape from the chambers 120 formed by the grid 118. To prevent the escaping gasses from one chamber from igniting the combustible masses in adjacent chambers, the gasses are baffled by a baffle structure 126. The baffle structure allows the gasses to pass to the atmosphere. The baffle structure 126 may be formed for example from polycarbonate plastic with wall structures approximately 1 mm thick, and is bonded to the back of the flex circuit 110 with epoxy or silicone rubber adhesive.

Figure 6:
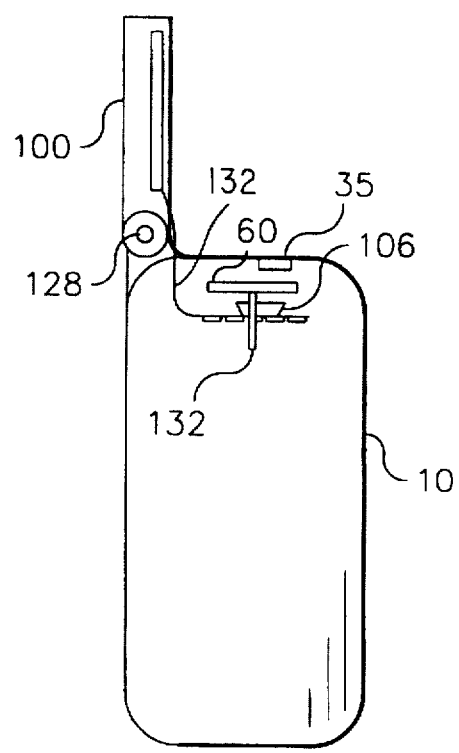
FIG. 6 is a schematic side view of the single-use camera shown in FIG. 2.

Referring to FIG. 6, the flash array 100 is pivotally mounted on the camera 10 by a hinge 128. The conductors on the flex circuit 110 lead into the camera body 10. Referring back to FIG. 4, the conductors 111 are gathered into a flexible tongue 130 that is located proximal to the frame counter 60. The tongue 130 is brought under the frame counter 60, and a commutator brush 106 carried by the frame counter 60 sweeps the commutator contacts 104 and a conductor ring 132, that is connected to one terminal of battery 90 by conductor 134. The commutator brush 106 on the frame counter 60 sequentially contacts each of the commutator contacts 104 as the frame counter 60 rotates. The numbers on the frame counter 60, commutator brush 106 and commutator contacts 104 are positioned to provide a one-to-one relationship between the three components.

When the operator advances the film, the frame counter 60 advances the commutator brush 106 through non-conducting areas of the flex circuit. During this time, the mechanism cocks the high energy lever 44 so that the flash firing switch 108 is moved into the open position. After the flash firing switch 108 is open, the commutator brush 106 slides onto the next commutator contact 104 connected to the next flash unit in the sequence. The operator releases high energy lever 44 by depressing shutter release button 37. As high energy lever 44 begins to move, flash firing switch 108 closes connecting battery 90 through commutator 103 to fire a flash unit 102. Upon ignition, igniter link 114 vaporizes and opens the connection to the battery 90, even though flash firing switch 108 remains closed. The operator then advances film 22 using the thumb wheel 48 to the next frame. Repeating these steps, a series of flash illuminated photographic images are captured on film 22.

In an alternative embodiment, (not shown) a flat battery may be stored at the back of the flash array 100 rather than in the camera 10. In this arrangement, flexible tongue 130 is used to commutate the firing of flash units 102. Conductor 134 is incorporated into tongue 130 and returns as part of tongue 130 back into flash array 100. The ground trace 112 connects to one terminal of the battery inside the flash array. Power trace 109 and ground trace 112 are incorporated into flexible tongue to provide electrical interconnection to flash firing switch 108 in camera body 10.

In an alternative embodiment, the circuit board that forms the base of the flash array 100 is a stiff circuit board, preferably conventional fiber reinforced polymeric circuit board material, and the circuit that carries the conductors that lead to the camera is a flex circuit that is connected to the flash array.

The invention has been described with reference to a preferred embodiment. However, it will be appreciated that variations and modifications can be effected by a person of ordinary skill in the art without departing from the scope of the invention.

PARTS LIST 10 single-use camera
12 main body part
14 front cover part
16 rear cover part
17 film roll chamber
18 film roll chamber
19 film cartridge
20 film take up spool
21 opening
22 film strip
23 cartridge spool
24 perforations
25 film leader
26 taking lens
28 lens retainer
30 lens support plate
34 viewfinder lenses
35 frame magnifier
36 keeper plate
37 shutter release button
40 shutter blade
42 shutter return spring
44 high energy lever
46 actuating spring
48 thumb wheel
49 exposed end of spool
50 film metering sprocket
51 teeth
52 metering cam
54 metering lever
56 metering spring
60 frame counter
80 light baffle
90 battery
91 battery receiving chamber
92 labels
100 chemical flash array
102 flash unit
103 commutator
104 commutator contacts
106 commutator brush
108 flash firing switch
109 power conductor
110 flex circuit
111 conductors
112 ground trace
114 igniter link
116 combustible mass
118 grid
120 chamber
122 transparent sheet
124 vent holes
126 baffle structure
128 hinge
130 flexible tongue
132 conductor ring
134 conductor

I claim:

1. A single-use camera including a camera body, a shutter driver, a battery, a film advance mechanism and a film frame counter connected to the film advance mechanism, comprising:

a) a compact photoflash lamp array, including:

i) a flexible circuit having a plurality of electrical conductors leading to an array of igniter links and defining the contacts of a commutator, and a common electrical connection to each igniter link;

ii) a combustible mass deposited over each igniter link;

iii) containment means for containing each combustible mass and allowing light to escape therefrom;

b) a commutator contact electrically connectable to the battery, carried by the frame counter and cooperating with the contacts on the flexible circuit to provide sequential electrical connection to successive igniter links; and c) a switch arranged to be closed by the shutter driver to electrically connect the battery through the commutator to an igniter link.

2. The single-use-camera claimed in claim 1, wherein the flexible circuit includes the contacts of the switch and electrical connections to the battery.

3. The single-use camera claimed in claim 1, further comprising:

d) a hinge connecting the photoflash lamp array and the camera body to allow the photoflash lamp array to swing between a storage position and a picture taking position.

4. The single-use camera claimed in claim 1, wherein the film frame counter is a disk that is rotated stepwise by the film advance mechanism.

5. The single-use camera claimed in claim 1, wherein the containment means comprises a grid, bonded to the substrate, the grid defining a corresponding array of combustion cavities, and a sheet of transparent material bonded over the grid.

6. A single-use camera including a camera body, and a shutter driver, comprising:

a) a battery;

b) a compact photoflash lamp array, including a plurality of electrically activated chemical photoflash lamps, integrally constructed on a flexible circuit, the photoflash lamp array being mounted on the camera body with a hinge to allow the photoflash lamp array to swing between a storage position and a picture taking position;

c) a commutator in the camera body for providing sequential electrical connection to successive photoflash lamps;

d) a switch arranged to be closed by the shutter driver to electrically connect the battery through the commutator to a photoflash lamp; and e) the flexible circuit being connected between the photoflash lamp array, the battery and the commutator, and the flexible circuit being sufficiently flexible to allow the photoflash lamp to hinge through 90°.

7. The single-use camera claimed in claim 6, wherein the camera further includes a film advance mechanism and a film frame counter connected to the film advance mechanism, and wherein the commutator is connected to the film frame counter.

8. The single-use camera claimed in claim 6, wherein the flexible circuit includes a plurality of electrical conductors leading to an array of igniter links and defining the contacts of a commutator, and a common electrical connection to each igniter link; and wherein the photoflash lamps comprise a combustible mass deposited over each igniter link; a grid, bonded to the substrate, the grid defining a corresponding array of combustion cavities; and a sheet of transparent material bonded over the grid.

9. The single-use camera claimed in claim 6, wherein the battery is located in the camera.

10. A compact photoflash lamp array, comprising:

a) a flexible circuit having an array of flash elements integrally constructed thereon, and a plurality of electrical conductors leading to an igniter link located within each flash element, said flexible circuit further having a common electrical connection to each igniter link, the portion of the flexible circuit having the common electrical connection being sufficiently flexible to fold through a 90° angle;

b) a combustible mass deposited on each flash element over each igniter link; and c) containment means having an array of chambers overlying the flash elements, for containing each combustible mass and allowing light to escape therefrom.

11. The compact photoflash lamp array claimed in claim 10, wherein the flexible circuit is 3 mil polyimide.

12. The compact photoflash lamp array claimed in claim 10, wherein the igniter links are fusible.

13. The compact photoflash lamp array claimed in claim 10, further comprising a battery connectable to the electrical conductors for firing the flash array.

14. The compact photoflash lamp array claimed in claim 10, wherein the flexible circuit further defines an extension bearing electrical conductor adapted to be addressed by a camera for controlling ignition of the flash.

15. The compact photoflash lamp array claimed in claim 10, wherein the photoflash lamp array is mounted on a camera with a hinge to allow the photoflash lamp array to swing between a storage position and a picture taking position.

16. The compact photoflash lamp array claimed in claim 10, wherein the containment means comprises a grid, bonded to the substrate, the grid defining a corresponding array of combustion cavities, and a sheet of transparent material bonded over the grid.

17. The compact photoflash lamp array claimed in claim 10, wherein the flexible circuit further defines the contacts of a commutator for addressing the igniter links.

18. A compact photoflash lamp array, comprising:

a) a flexible circuit having a plurality of electrical conductors leading to an array of igniter links and a common electrical connection to each igniter link;

b) a combustible mass deposited over each igniter link;

c) containment means for containing each combustible mass and allowing light to escape therefrom; and wherein d) said flexible circuit is a thin polyimide.

19. A compact photoflash lamp array for use with a camera body, comprising:

a) a flexible circuit having a plurality of electrical conductors, originating from a flexible tongue positioned inside the camera body, leading to an array of igniter links and a common electrical connection to each igniter link, the flexible tongue being sufficiently flexible to fold through a 90° angle;

b) a combustible mass deposited over each igniter link; and c) containment means for containing each combustible mass and allowing light to escape therefrom.

\* \* \* \* \*